(No Model.)
D. H. KING.
CHURN.
No. 501,839. Patented July 18, 1893.
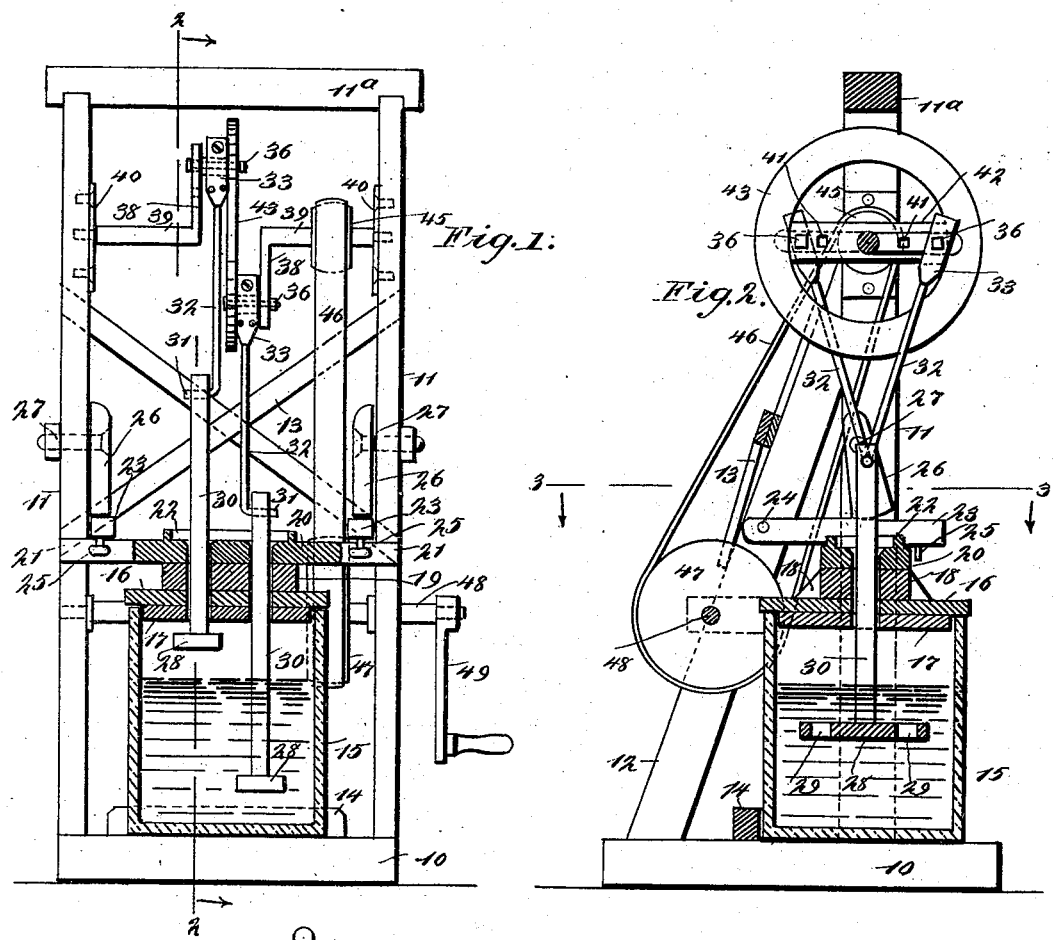
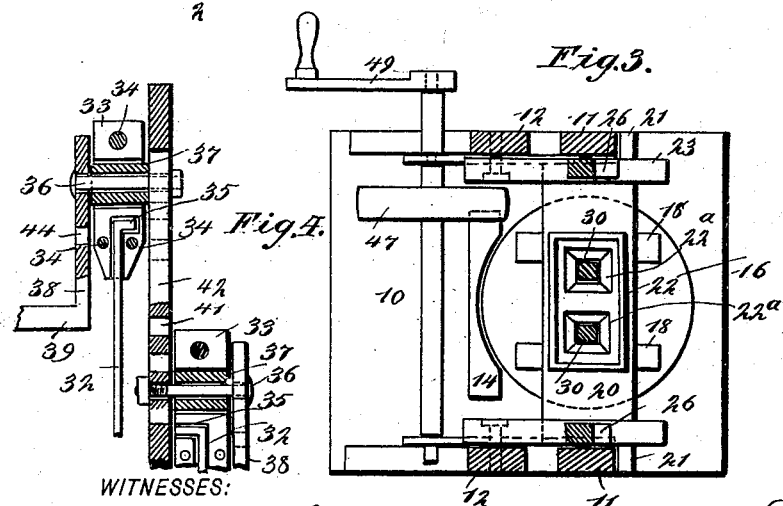
WITNESSES:
F. McArdle.
C. Sedgwick.
INVENTOR
D. H. King
BY
Munn & Co
ATTORNEYS.

UNITED STATES PATENT OFFICE.

DOWNING H. KING, OF FARMERSVILLE, ILLINOIS.

CHURN.

SPECIFICATION forming part of Letters Patent No. 501,839, dated July 18, 1893.

Application filed March 10, 1893. Serial No. 465,397. (No model.)

*To all whom it may concern:*

Be it known that I, DOWNING H. KING, of Farmersville, in the county of Montgomery and State of Illinois, have invented a new and Improved Churn, of which the following is a full, clear, and exact description.

My invention relates to improvements in churns; and the object of my invention is to produce an extremely simple churn adapted to use as a cream pot an ordinary stone jar, to provide reciprocating dashers for the churn, to arrange a simple and convenient mechanism for fastening the cover to the cream pot, to provide a simple crank mechanism by which the dashers may be reciprocated, to provide means for changing the length of the cranks and the stroke of the dashers, and in general to produce a simple and convenient churn by which cream may be rapidly converted to butter.

To these ends my invention consists of certain features of construction and combinations of parts, as will be hereinafter described and claimed.

Reference is to be had to the accompanying drawings forming a part of this specification, in which similar figures of reference indicate corresponding parts in all the views.

Figure 1 is a front elevation of the churn with the cream pot and its cover in vertical section. Fig. 2 is a vertical section on the line 2—2 in Fig. 1. Fig. 3 is a sectional plan on the line 3—3 in Fig. 2. Fig. 4 is a detail cross section of the fly wheel and of its connections with the cranks and pitmen of the churn; and Fig. 5 is a plan of one of the dashers, showing the dasher rod in section.

The churn has a suitable base 10 on which are erected upright parallel posts 11, these being connected at the top by a cross bar 11$^a$ and braced by the braces 12 extending from the upper portions of the posts to the base 10. The braces 12 are also connected by cross braces 13 and a compact and strong frame is thus produced. On the base 10 is a curved cleat 14 against which the cream pot or jar 15 may be placed, and this jar may be of any suitable kind although a stone jar is preferably used. The cream pot or jar is provided with a suitable cover 16 having a depending central portion 17 adapted to fit snugly in the top of the cream pot, and on the cover are short brace blocks 18 of triangular shape between which is held a cleat or block 19, and secured to the top of this is a cross bar 20 adapted to fit snugly between the posts 11 and having end lugs 21 adapted to overlap the front edges of the posts. Upon the central portion of the cross bar is a raised rib 22 which prevents any cream which may be raised by the dasher rods from running off the bar, and in the center of the bar are openings 22$^a$ for the passage of the dasher rods, these openings being enlarged at their upper ends to enable the cream to flow readily into the churn.

The cover is fastened to the cream pot by means of levers 23 and buttons which hold the levers, the levers being pivoted at their rear ends, as shown at 24, to the braces 12, and extending forward over the cross bar 20. On the under sides of the levers, near their free ends, are pins 25 which lie over the front edges of the cross bar and prevent, in a measure, its displacement. The rear ends of the levers 23 are fastened down tightly upon the cross bar by means of buttons 26 which are pivoted, as shown at 27, on the inner sides of the posts 11 and which have rounded lower ends adapted to press upon the levers.

In the cream pot are vertically reciprocating dashers 28, one being adapted to move upward while the other is moving downward, and this arrangement enables them to thoroughly agitate the cream so that all the butter in it is quickly collected. The dashers 28 are secured to dasher rods 30, which are of rectangular cross section, and which reciprocate vertically in the openings which extend through the cover and cross bar of the cream pot. The dasher rods are at their upper ends connected to the bent ends 31 of the upwardly extending pitmen 32 which terminate, at their upper ends, in separable blocks 33, the two parts of which are held together by bolts 34. The pitmen extend upward between the two parts of the blocks, as shown in Fig. 4, and each pitman is bent slightly at the top, as shown at 35, so as to engage a corresponding recess in the block and the pitman is thus locked in place.

The blocks 33 are pivoted on a sleeve 37 through which extends a square bolt 36 by means of which the block is fastened to a crank 38 of the shaft 39. There are two of these shafts, one for each block 33, and the shafts, when connected as described below, form practically a continuous crank shaft. The outer ends of the shaft are journaled in suitable supporting plates 40 on the inner sides of the posts 11. The blocks 33 are also secured, by means of the bolts 36, to a cross bar 42 on the fly wheel 43, this cross bar having suitable square holes 41 therein to receive the bolts. There are at least a pair of holes near each end of the cross bar, and the cranks 38 are also provided with a plurality of holes 44 and by adjusting the fastening bolts in the necessary holes 41 and 44, the stroke of the pitmen 32, dasher rods 30 and dashers 28 may be regulated, and thus a convenient means is provided for adapting the stroke of the dashers to the size of cream pot. One of the crank shafts 39 is provided with a pulley 45, which connects by a belt 46 with a pulley 47 on a shaft 48 which is journaled in suitable supports in the main frame and provided with a crank 49 by which it may be turned.

When the churn is used, the cream is placed in the cream pot, the cover 16 is applied and locked in place by the levers 23 and buttons 26, after which the operator simply turns the crank 49 which drives the shaft 48 and crank shaft 39, and the pitmen 32 are thus actuated so as to give a rapid reciprocating movement to the dasher rods and dashers, and the cream is quickly turned to butter.

The fly wheel 43, besides affording a convenient means for adjusting the stroke of the dashers, also imparts a steady movement to the crank shafts and through these to the dashers.

Having thus described my invention, I claim as new and desire to secure by Letters Patent—

1. A churn, comprising an upright frame, a cream pot on the base of the frame, an apertured cover for the pot, means for securing the cover in place, two dashers having their dasher rods extending through the apertures of the cover, two shafts mounted in the frame and each provided with a crank arm, a fly wheel between the inner ends of the said shafts, pitmen having their lower ends connected to the dasher rods and their upper ends adjustably secured to the fly wheel and crank arms, and means for operating one of the said shafts, substantially as described.

2. In a churn, the combination with reciprocating dashers, and pitmen connected with the dasher rods, of two shafts each provided with an apertured crank arm, a fly wheel between the inner ends of the said shafts and provided with an apertured cross bar, blocks to which the pitmen are secured between the fly wheel and crank arms, and bolts passing through the cross bar of the fly wheel and crank arms, substantially as described.

3. In a churn, the combination with reciprocating dashers, and pitmen connected with the dasher rods and having bent upper ends, of two shafts, each provided with an apertured crank arm on its inner end, a fly wheel between the crank arms and provided with an apertured cross bar, bolts passing through the apertures of the crank arms and the cross bar of the fly wheel, sleeves on the bolts, and blocks made in two parts recessed to receive the bent ends of the pitmen and pivoted on the said sleeves, substantially as described.

DOWNING H. KING.

Witnesses:
W. T. THURMAN,
MARION CHINART.